United States Patent [19]
Quinn

[11] Patent Number: 4,790,159
[45] Date of Patent: Dec. 13, 1988

[54] QUIC-KEY SYSTEM

[76] Inventor: Roy C. Quinn, 48 Glenda Rd., Deer Park, N.Y. 11729

[21] Appl. No.: 167,263

[22] Filed: Mar. 11, 1988

[51] Int. Cl.⁴ .............................................. F16B 41/00
[52] U.S. Cl. .......................................... 70/232; 70/57; 70/91
[58] Field of Search ................. 70/232, 231, 230, 229, 70/58, 258, 57, 77, 91, 95, 101, 181, 182; 16/380

[56] References Cited

U.S. PATENT DOCUMENTS

| | | | |
|---|---|---|---|
| 1,321,277 | 11/1919 | Berta | 16/380 |
| 3,711,894 | 1/1973 | Walters | 70/91 |
| 4,057,985 | 11/1977 | Stahl | 70/231 |
| 4,406,140 | 9/1983 | Wolter | 70/231 |
| 4,466,261 | 8/1984 | Zimmer | 70/229 |

Primary Examiner—Robert L. Wolfe
Attorney, Agent, or Firm—Leonard Belkin

[57] ABSTRACT

Apparatus for securing against removal of the hinge pin of a door or other closure. The arrangement comprises an inner sleeve with holes to align with a hole in the hinge pin to accomodate a holding pin. An outer cylinder encloses the inner sleeve to prevent the escape of the holding pin. A wafer lock has a body which extends through the outer cylinder into the inner sleeve which is provided with internal notches or grooves. Removal of the key causes wafers to extend form the key body to grip the notches or grooves thereby preventing removal of the hinge pin from the hinge. Other embodiments of the inner sleeve fascilitate its use.

17 Claims, 2 Drawing Sheets

QUIC-KEY SYSTEM

BACKGROUND OF THE INVENTION

This invention relates to a quick lock system and method for use with doors and more particularly to such a system applied to secure vehicle doors against unauthorized removal.

In certain types of vehicles, such as four wheel drive vehicles which are driven in all kinds of terrain typically for recreational purposes, the tops and doors are removed when the vehicle is to be driven. To render convenient the removal of the doors, the hinges attached to the vehicle are generally on the outside, and the hinge pins are attached to doors and are readily lifted off the attached to the vehicle body.

That very convenience, however, which makes it so easy and quick to remove the doors also has made it easy for the doors to be stolen or taken away by persons unauthorized to do so. These doors come in a variety of styles and construction, and thus vary considerably in value, encouraging the theft of these doors. The increasing incidence of theft in the industry has become a problem for manufacturers of the vehicles as well as the owners of the vehicles.

In order to avoid or minimize the problem described above it is possible to place the hinges within the vehicle itself and provide locks for the doors but this would detract from the convenience and ambience associated with this type of vehicle.

SUMMARY OF THE INVENTION

In the present invention the security problems mentioned above existing with respect to vehicles of the type herein described are reduced considerably by making it much more difficult to remove the doors by unauthorized persons while at the same time maintaining the convenience of removing the doors by the vehicle owner or a person given permission to do so.

In accordance with a preferred embodiment of this invention there is provided a locking system for the hinge pins utilizing a lock which does not even have to be turned in order to lock and unlock the hinge pins, hence the quic-key system. The exposed tip of the pin to be locked is provided with a hole which matches holes in an inner sleeve which covers the bottom of the pin and a holding pin is inserted through all of the holes to hold the inner sleeve in place. The inner sleeve is provided with internal notches or grooves below the bottom tip of the hinge pin. An outer cylinder is placed over the inner sleeve which prevents the holding pin from escaping. The mounting of the inner sleeve effectively prevents removal of the hinge pin and hence the door itself.

The outer cylinder is provided with an internal shoulder below the inner sleeve. Into the bottom opening of the inner sleeve and the outer cylinder is inserted a wafer plug lock with the key inserted. When the key is removed from the lock the wafers are caused to extend radially from the tumbler plug of the lock engaging the internal notches or grooves of the inner sleeve. The lock and outer cylinder are provided with shoulders which make contact with each other. Consequently, with the inner sleeve and the outer cyclinder in place with the tumbler plug engaged with the inner sleeve, and the key removed, the hinge pin can not be removed. In order to remove the hinge pin it is merely necessary to insert the correct key which will cause the wafers to retract permitting removal of the outer cylinder, the holding pin and the inner sleeve.

It is thus a principal object of this invention to provide a locking arrangement for the hinge pins in a door.

Other objects and advantages of this invention will hereinafter become obvious from the following detailed description of preferred embodiments of this invention.

DETAILED DESCRIPTION OF THE PREFERRED EMBODIMENTS

Figure 1:
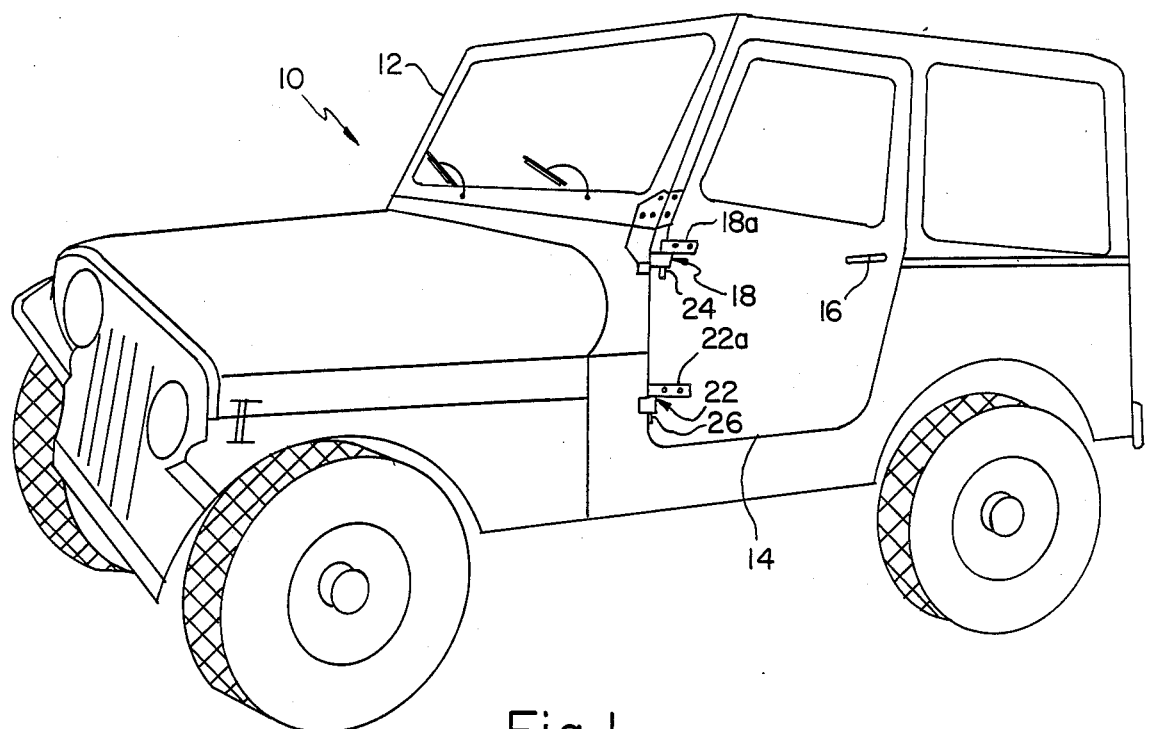
FIG. 1 is an isometric view of a recreational vehicle with exposed door hinges and hinge pins.

FIG. 1 illustrates a jeep type vehicle 10 having a removable top 12 and door 14. As is understood in the art the door on the other side of the vehicle not visible in this figure is the mirror image of door 14.

Door 14 may be provided with a handle 16 and upper and lower hinge assemblies 18 and 22. Door 14 is secured to vehicle 10 by the use of a pair of hinge pins 24 and 26 which are attached to brackets 18a and 22a on door 14. Pins 24 and 26 are merely dropped into place to make it convenient to remove door 14.

Figure 2:
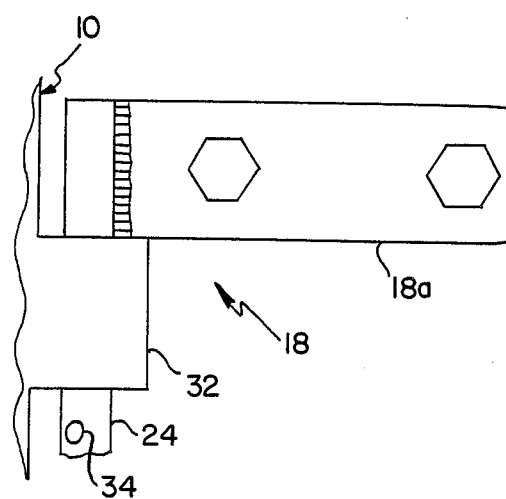
FIG. 2 is a detail of the hinge showing the hinge pin prepared for use as a part of this invention.

FIG. 2 illustrates this arrangement in detail for hinge assembly 18 which consists of bracket 18a mounted on door 14 and a body hinge 32 extending from vehicle 10 itself. Hinge pin 24 attached to bracket 18a holds the assembly together as illustrated by passing through hinge 32.

As noted earlier, this arrangement, while making it very convenient to prepare the vehicle for its intended recreational use, also is very insecure when it comes to protecting the vehicle against theft of its doors which can readily be removed by lifting the door to take pins 24 and 26 out of their respective door hinges.

Figure 3:
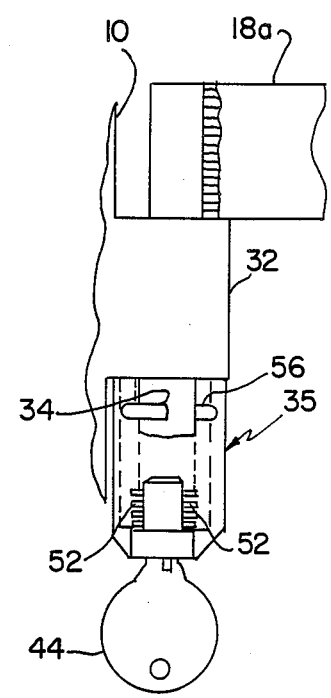
FIG. 3 is an elevation view of the hinge of FIG. 2 with a preferred embodiment of this invention mounted and the key inserted.
Figure 4:
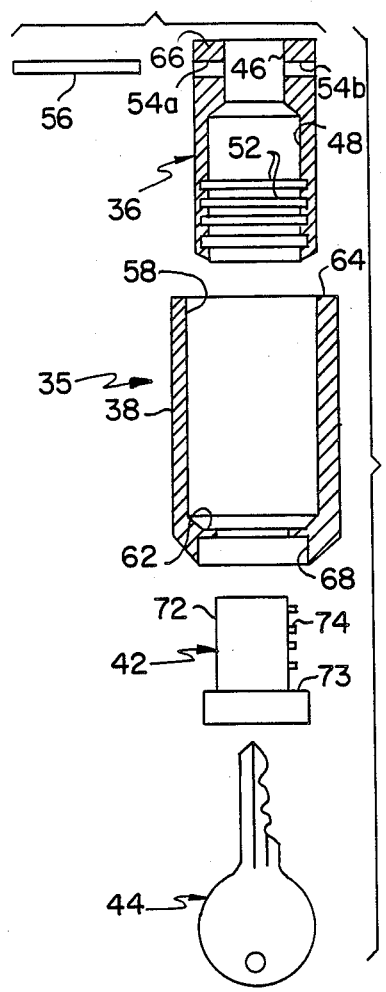
FIG. 4 is an exploded view of the assembly making up a preferred embodiment of this invention.

This invention, as illustrated in FIGS. 2 to 4 showing a preferred embodiment, renders it much more difficult for an unauthorized person to remove hinge pin 24 from hinge 32 and hence door 14.

To accomplish this result, in accordance with the principles of this invention, pin 24 is prepared by drilling a hole 34. Typically the apparatus to be described for securing hinge pin 24 need only be used on one of the door hinges, for example, the upper door hinge.

The remaining assembly 35 of this invention as best seen in FIG. 4 consists of an inner sleeve 36, an outer cylinder 38, a wafer lock 42, and key 44 which is designed to operate lock 42.

Inner sleeve 36 is cylindrical with an opening 46 at one end just large enough to accomodate hinge pin 24 and an enlarged cavity 48 whose surface is provided with notches or grooves 52 for a purpose to be described below. Transversely extending openings 54a and 54b along a diameter of sleeve 36 are positioned to be aligned with hole 34 in hinge pin 24 to accomodate holding pin 56.

Outer cylinder 38 has an internal opening 58 sufficiently large to accomodate inner sleeve 36 and a shoulder 62 to abut against sleeve 36 when assembled, as seen also in FIG. 3. The upper edge 64 is aligned with upper edge 66 of sleeve 36 when sleeve 36 and cylinder 38 are assembled as seen in FIG. 3. The portion of cylinder 38 below shoulder 62 is provided with an opening 68 to be described below.

Wafer lock 42 is a commercially available lock consisting of a cylindrical barrel 72 with openings to accomodate the extension and retraction of wafers 74 and a shoulder 73. When key 44 is inserted into lock 42, wafers 74 retract into barrel 72 and are not visible. When key 44 is removed as shown in FIG. 4, wafers 74 extend outwardly as illustrated.

In the operation of the apparatus just described, inner sleeve 36 is inserted over the end of hinge pin 24 as shown in FIG. 2 and openings 54a and 54b are aligned with hole 34. Holding pin 56 is then inserted, thereby engaging inner sleeve 36 to hinge pin 24.

Outer sleeve 38 is then moved up to fully enclose sleeve 36 thereby blocking the removal of holding pin 56. Key 44 is inserted in lock 42 thereby retracting wafers 74 into barrel 72. Lock 42 with key 44 inserted is then moved through outer cylinder 38 into inner sleeve 36 until shoulder 73 of lock 42 abuts the under surface of shoulder 62 in cylinder 38. The outer diameter of lock shoulder 73 just fits within opening 68 in cylinder 38.

Key 44 is then removed resulting in wafers 74 being extended outwardly and engaging notches or grooves 52 in inner sleeve 36, effectively preventing the removal of hinge pin 24.

The mere insertion of key 44 results in the whole assembly just described being removable thereby permitting holding pin 56 to be removed and freeing up hinge pin 24 so door 10 can to be taken off. No rotation of key 44 is required and the whole assembly once mounted on pin 24 is small and compact and barely noticeable. The outer surface of cylinder 38 may be finely knurled in order to make the assembly appear less intrusive and more pleasing in appearance.

Figure 5:
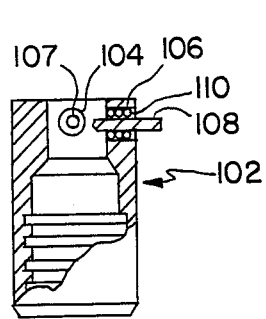
FIG. 5 is a partial section of an inner sleeve incorporating an alternative embodiment of this invention.

In FIG. 5 is illustrated an alternative construction for inner sleeve 36 shown in FIG. 4. Inner sleeve 102 is identical to sleeve 36 except that two radial holes 104 and 106 are provided at right angles to each other, each one with a spring mounted holding pin such as pin 107 for hole 104 and pin 108 for hole 106 with a spring 110 biasing pin 108 outwardly as illustrated. When sleeve 102 is inserted over hinge pin 24', which would be provided with two openings such as holes or notches 24'a and 24'b at right angles to each other as seem in FIG. 7, holding pins 107 and 108 would be squeezed in and held in place until the outer cylinder 36 is put in place. The advantage of this arrangement is that holding pins 107 and 108 are attached to sleeve 102 and there is less likelihood of losing or misplacing a holding pin.

Figure 7:
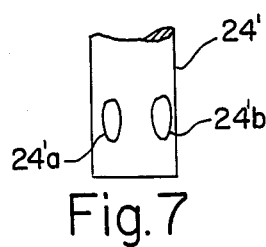
Figure 6:
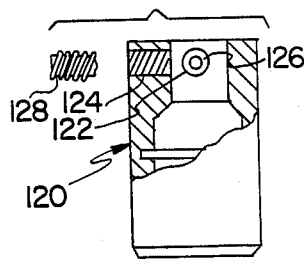
FIG. 6 is a partial section of an inner sleeve incorporating another alternative embodiment of this invention.

Still another embodiment of inner sleeve 36 is shown in FIG. 6 wherein inner sleeve 120 is provided with a pair of threaded openings 122 and 124 at right angels to each other with set screws 126 and 128 for openings 122 and 124, respectively, for use with pin 24' shown in FIG. 7. If desired, it may not be necessary to have holes or notches 24'a and 24'b in pin 24'. The set screws, made tight enough, could produce their own notches of sufficient depth to secure pin 24'. In this arrangement, there may be greater ease and convenience in assembling the parts.

It is thus seen that there has been provided a unique and convenient arrangement for safeguarding doors on recreational vehicles with exposed hinges. Of course, this invention would be equally suitable for any door or closure with exposed hinges and readily removable hinge pins.

While only certain preferred embodiments of this invention have been described it is understood that many modifications are possible without departing from the principles of this invention as set forth in the claims which follows.

What is claimed is:

1. Apparatus for securing the exposed end of a hinge pin to prevent retraction of said pin, said pin including a hole along a diameter of said pin adjacent said exposed end, comprising:
   a. inner sleeve means for enclosing said exposed end and including openings aligned with said hole to accomodate a holding pin means to engage said sleeve means with said pin;
   b. outer cylinder means to enclose said inner sleeve means to prevent said holding pin from being removed;
   c. lock means for insertion through said outer cylinder means and extending into the interior of said inner sleeve means; and
   d. key means for causing expansion of gripping means out of said lock means to engage said inner sleeve means to prevent removal of the latter from said hinge pin thereby maintaining said holding pin means in place and securing said hinge pin.

2. The apparatus of claim 1 wherein said inner sleeve means includes a cavity lined with notches or grooves to be engaged by said gripping means.

3. The apparatus of claim 2 wherein said outer cylinder means includes shoulder means adjacent the end of said inner sleeve means opposite the entry of said hinge pin to accomodate said lock means.

4. The apparatus of claim 3 wherein said lock means comprises a barrel which passes through the shoulder means of said outer cylinder means and extends into the cavity within said inner sleeve means, said lock means having a second shoulder means to engage said first shoulder means preventing retraction of said outer cylinder means.

5. The apparatus of claim 4 wherein said gripping means extends out of said barrel of said lock means to engage said notches or grooves.

6. The apparatus of claim 5 wherein insertion of said key causes retraction of said gripping means into said barrel and removal of said key causes expansion or extension of said gripping means to engage said notches or grooves.

7. The apparatus of claim 5 wherein said holding pin means comprises a spring mounted pin biased away from said inner sleeve means.

8. The apparatus of claim 5 wherein said holding pin means comprises at least one set screw.

9. Apparatus for securing the exposed end of a hinge pin to prevent retraction of said pin, said pin including a pair of openings along a diameter of said pin at right angles to each other adjacent said exposed end, comprising:
   a. inner sleeve means for enclosing said exposed end and including openings aligned with said openings to accommodate holding pin means to engage said sleeve means with said pin;

b. outer cylinder means to enclose said inner sleeve means to prevent said holding pins from being removed from said openings;

c. lock means for insertion through said outer cylinder means and extending into the interior of said inner sleeve means; and d. key means for causing expansion of gripping means out of said lock means to engage said inner sleeve means to prevent removal of the latter from said hinge pin thereby maintaining said holding pin means in place and securing said hinge pin.

10. The apparatus of claim 9 wherein said inner sleeve means include a cavity lined with notches or grooves to be engaged by said gripping means.

11. The apparatus of claim 10 wherein said outer cylinder means includes shoulder means adjacent the end of said inner sleeve means opposite the entry of said hinge pin to accommodate said lock means.

12. The apparatus of claim 11 wherein said lock means comprises a barrel which passes through the shoulder means of said outer cylinder means and extends into the cavity within said inner sleeve means, said lock means having a second shoulder means to engage said first shoulder means preventing retraction of said outer cylinder means.

13. The apparatus of claim 12 wherein said gripping means extends out of said barrel of said lock means to engage said notches or grooves.

14. The apparatus of claim 13 wherein insertion of said key causes retraction of said gripping means into said barrel and removal of said key causes expansion or extension of said gripping means to engage said notches or grooves.

15. The apparatus of claim 14 wherein said holding pin means comprise a spring mounted pins biased away from said inner sleeve means.

16. The apparatus of claim 14 wherein said holding pin means comprise set screws and said openings are formed by said set screws.

17. A method for securing the exposed end of a hinge pin to prevent retraction of said pin, said pin including a hole along a diameter of said pin adjacent said exposed end, comprising the steps of inserting inner sleeve means over the end of said pin, said inner sleeve means including openings aligned with said hole to accommodate a holding pin means to engage said sleeve means with said pin inserting an outer cylinder means over said inner sleeve means to prevent said holding pin from being removed, and lock means containing key means through said outer cylinder means into the interior of said inner sleeve means, and removing said key means for causing expansion of gripping means out of said lock means to engage said inner sleeve means to prevent removal of the latter from said hinge pin thereby maintaining said holding pin means in place and securing said hinge pin.

* * * * *